(12) United States Patent
Hakim

(10) Patent No.: US 6,241,110 B1
(45) Date of Patent: Jun. 5, 2001

(54) BABY PRODUCTS AND METHODS OF MANUFACTURE

(76) Inventor: Nouri E. Hakim, 3030 Aurora St., Monroe, LA (US) 71201

( * ) Notice: Subject to any disclaimer, the term of this patent is extended or adjusted under 35 U.S.C. 154(b) by 0 days.

(21) Appl. No.: 09/271,395

(22) Filed: Mar. 17, 1999

Related U.S. Application Data

(60) Provisional application No. 60/097,547, filed on Aug. 21, 1998.

(51) Int. Cl.⁷ .............................. A61J 11/00; A61J 17/00
(52) U.S. Cl. .......................................... 215/11.1; 606/234
(58) Field of Search ......................... 215/11.1; 606/234

(56) References Cited

U.S. PATENT DOCUMENTS

| | | | |
|---|---|---|---|
| D. 87,240 | * | 6/1932 | Podell ................ 606/235 X |
| D. 336,520 | * | 6/1993 | McDaniel ............ 606/235 X |
| 686,109 | * | 11/1901 | Mulhens ................ 215/11.1 |
| 1,632,854 | * | 6/1927 | Rogers ................... 215/11.1 |
| 1,902,433 | * | 3/1933 | Brown .................... 215/11.1 |
| 1,913,627 | * | 6/1933 | Epstein ................... 215/11.1 |
| 1,989,060 | * | 1/1935 | Liddick .................. 215/11.1 |
| 2,001,842 | * | 5/1935 | Heise et al. ............ 215/11.1 |
| 2,366,214 | * | 1/1945 | Ramaker ................ 215/11.1 |
| 2,388,915 | * | 11/1945 | Heilborn ................ 215/11.1 |
| 2,588,069 | * | 3/1952 | Allen ..................... 215/11.1 |
| 2,954,030 | * | 9/1960 | Jozwiak ................. 215/11.1 |
| 3,022,915 | * | 2/1962 | Mullin ................... 215/11.1 |
| 3,051,341 | * | 8/1962 | Mead ..................... 215/11.1 |
| 3,342,365 | * | 9/1967 | Lux et al. .......... 215/11.1 X |
| 4,623,069 | * | 11/1986 | White .................... 215/11.1 |
| 5,004,473 | * | 4/1991 | Kalantar ............ 215/11.1 X |
| 5,322,031 | * | 6/1994 | Lerner et al. ...... 215/11.1 X |
| 5,544,766 | * | 8/1996 | Dunn et al. ............ 215/11.1 |
| 5,606,871 | * | 3/1997 | Hansen et al. ...... 606/235 X |
| 5,653,731 | * | 8/1997 | Rhorig .................. 606/234 |
| 5,673,806 | * | 10/1997 | Busnel ................... 215/11.1 |
| 5,711,759 | * | 1/1998 | Smith et al. ........ 606/234 X |
| 6,041,950 | * | 3/2000 | Soehnlein .............. 215/11.1 |

FOREIGN PATENT DOCUMENTS

| | | | |
|---|---|---|---|
| 469055 | * | 10/1950 | (CA) ..................... 215/11.1 |
| 233982 | * | 12/1944 | (CH) ..................... 215/11.1 |
| 639426 | * | 12/1936 | (DE) ..................... 215/11.1 |
| 12962 | * | 5/1893 | (GB) ..................... 215/11.1 |
| 18743 | * | 5/1893 | (GB) ..................... 215/11.1 |
| 1621935 | * | 1/1991 | (SU) ..................... 215/11.1 |

\* cited by examiner

*Primary Examiner*—Sue A. Weaver
(74) *Attorney, Agent, or Firm*—Morris E. Cohen

(57) ABSTRACT

Improved pacifier baglets and baby bottle nipples having protrusions thereon to rub against the child's gums and thereby assist with teething. The protrusions can be of any desired shape or configuration. In a further embodiment, the baglets and nipples include materials of at least two hardnesses, with a harder material being provided in the protrusions to further facilitate the teething process.

95 Claims, 14 Drawing Sheets

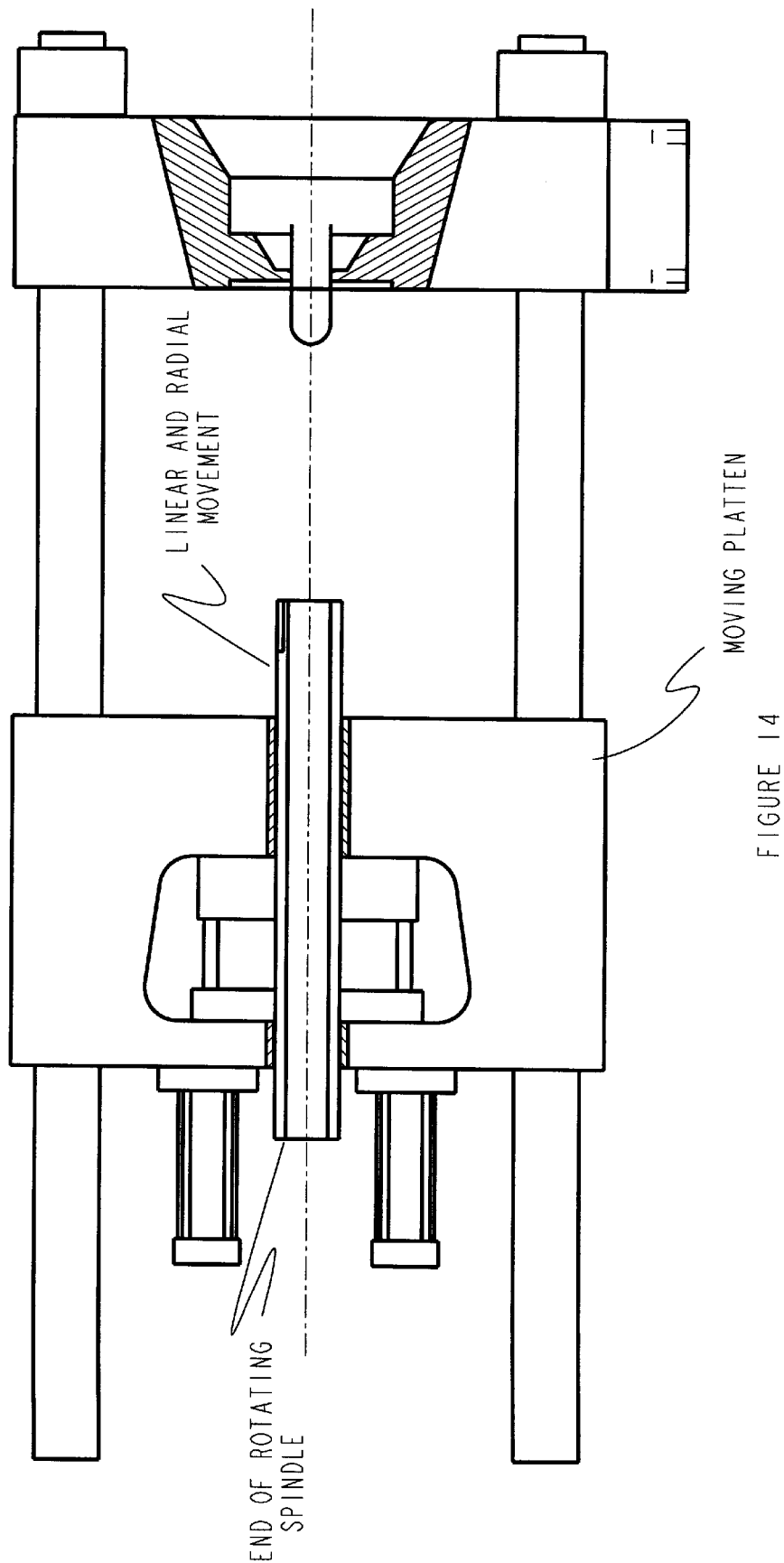

BABY PRODUCTS AND METHODS OF MANUFACTURE

RELATED APPLICATIONS

This application claims the benefit of and all rights of priority to U.S. Provisional application Ser. No. 60/097,547, filed Aug. 21, 1998, the disclosure of which is fully incorporated herein by reference.

FIELD OF THE INVENTION

The present invention is directed to improved baby products, such as children's pacifiers, baglets, and baby bottle nipples. The present invention is also directed to methods for construction of such products.

SUMMARY OF THE INVENTION

In accordance with one embodiment of the present invention, a combination pacifier shield is provided having at least two components of different compositions or hardnesses. In a preferred embodiment, the pacifier includes a soft shield component which rests against a child's face and a hard shield backing component which improves the overall structural integrity of the shield and pacifier.

In a further preferred embodiment of the invention, a combination baglet is provided. As is well known in the art, the baglet is the portion of a pacifier that a child sucks on, and the nipple is the portion of a baby bottle that the child sucks on to drink therefrom. The term baglet is generally used in the art with reference to pacifiers, and the term nipple with respect to baby bottles. In the present application, however, including both the specification and claims, the term baglet is broadly used to refer to both baglets of pacifiers and nipples of baby bottles for the sake of clarity and ease of discussion.

In accordance with the present invention, the combination baglet has at least two components of different hardnesses provided therein. In one preferred embodiment, the baglet has soft and hard components. In one such embodiment, silicones are used of different hardnesses. The soft component is preferably any of the traditional materials used in the art for a traditional baglet. The hard components, in contrast, are preferably harder raised portions or bumps which are provided on or in the baglet for a baby to teethe on.

In an additional or alternative embodiment, the baglet has bumps thereon to assist the baby with teething. These bumps preferably comprise raised sections or areas on the baglet (although they can alternately be depressed sections), which rub against the baby or child's gums. The bumps can be of any desired shape or configuration.

Further embodiments of the invention will be apparent in conjunction with the drawings and the detailed disclosure herein.

BRIEF DESCRIPTION OF THE FIGURES

FIG. 14 is a plan view of an injection molding machine, modified for automated production of a baglet in accordance with the present invention.

DETAILED DESCRIPTION OF THE INVENTION AND THE PREFERRED EMBODIMENTS

The present invention is directed to improved child and infant pacifiers, baglets and nipples and to methods for pacifier, baglet and nipple construction. In a further embodiment, the invention is directed to improved pacifier baglets and nipples having portions provided thereon or therein which are harder than the remainder of the baglet or nipple, to provide a baby with harder durometer sections on which the baby can teethe.

In a first embodiment of the invention, the invention is directed to child and infant pacifier shields. In the present state of the art, although polypropylene is an available material for children's pacifier shields, it is also, practically speaking, a very hard material for a child or infant's daily use. If a child falls down while he or she has a pacifier in his or her mouth having a shield constructed from polypropylene, the polypropylene material will make a hard impact on the child's face, thereby potentially causing the child pain or injury.

Kraton, on the other hand, is a soft, spongy, material. Yet, although Kraton is a much more comfortable material for resting against the mouth of a child, for safety considerations a pacifier or pacifier shield cannot be wholly constructed out of it. If the entire pacifier or pacifier shield were made of Kraton, the pacifier would fail the butterfly gauge test, i.e. the two (2) lb. pull test which all pacifiers must be able to pass under consumer safety regulations.

Accordingly, pursuant to one embodiment of the present invention, a combination material pacifier is provided. The pacifier shield includes a Kraton pacifier shield component, which rests against the baby's skin, and a polypropylene pacifier shield component which serves as a backing. The Kraton shield shield component provides a soft, spongy material next to the baby's face and softens any impact if the baby falls with the pacifier in its mouth. In addition, the Kraton component also covers the edges of the pacifier, so that the edges of the pacifier are soft and cushioned, as well. Thus, pacifier edges will not scratch or hurt the child's face or be unduly uncomfortable.

Figure 1:
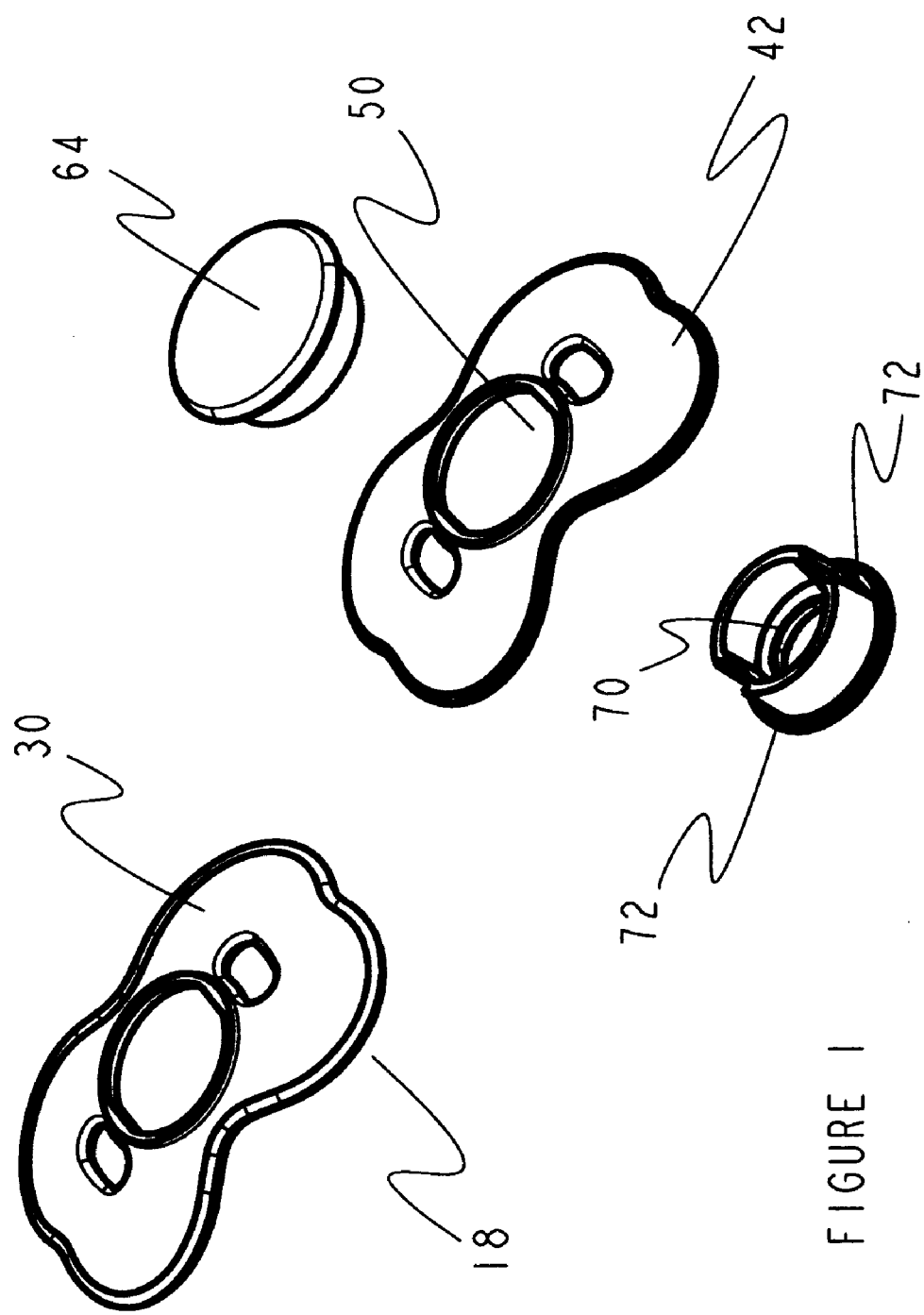
FIG. 1 is an exploded, perspective view of a first embodiment of the pacifier shield of the present invention.
Figure 2:
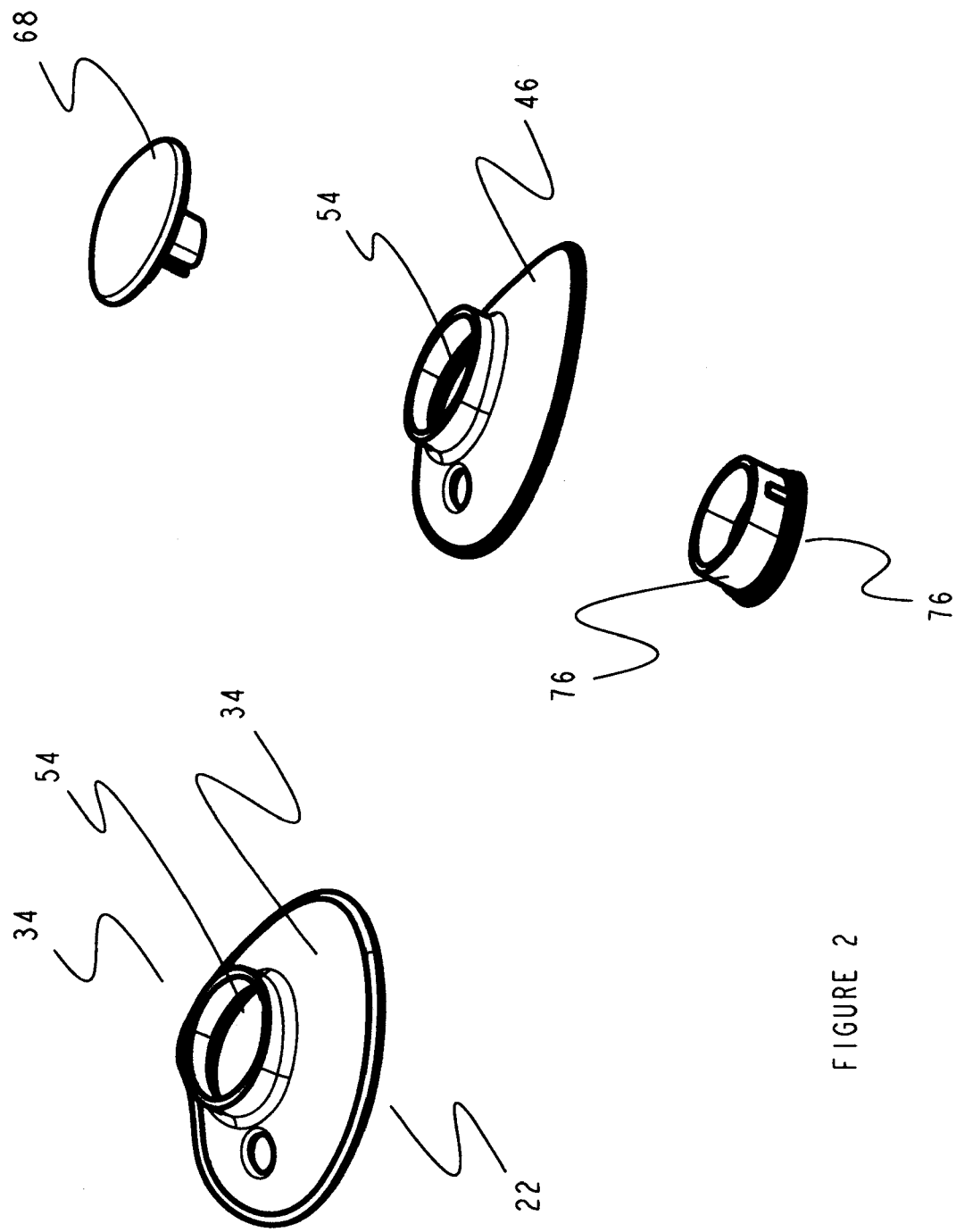
FIG. 2 is an exploded, perspective view of a second embodiment of the pacifier shield of the present invention.

Further details of the invention will be apparent with reference to FIGS. 1 and 2. FIG. 1 is an exploded, perspective view of a first embodiment of the invention in which the invention includes a butterfly style shield. FIG. 2 is an exploded, perspective view of a second embodiment of the invention which uses a "nuk" style shield.

In the present state of the art, it is not believed to be possible to sonic weld materials to polypropylene. In fact, polypropylene cannot even be sonic welded to itself consistently. Consequently, the Kraton and polypropylene components cannot be sonic welded to each other.

Accordingly, pursuant to the present invention, a new construction method for constructing a composite pacifier shield is provided as shown in FIGS. 1 and 2. In a preferred embodiment, the composite shield includes at least two components, a hard shield component and a softer shield component.

As shown in FIG. 1, pacifier 18 is provided having a composite pacifier shield which includes a Kraton shield 30 directly secured to a polypropylene shield 42. In the preferred embodiment, the Kraton shield 30 is insert molded onto polypropylene shield 42. This can be effected by compression molding, by injection molding, or transfer molding, using the molding techniques known in the art. In the preferred embodiment, the polypropylene is molded at approximately 290–390 degrees F. The polypropylene is then maintained at approximately 70–110 degrees F., and the Kraton component is molded thereon. The Kraton is preferably molded on when it is at a temperature of approximately 290–390 degrees F. This heating of the polypropylene and the Kraton assists the Kraton in physically bonding to the polypropylene material.

Figure 12:
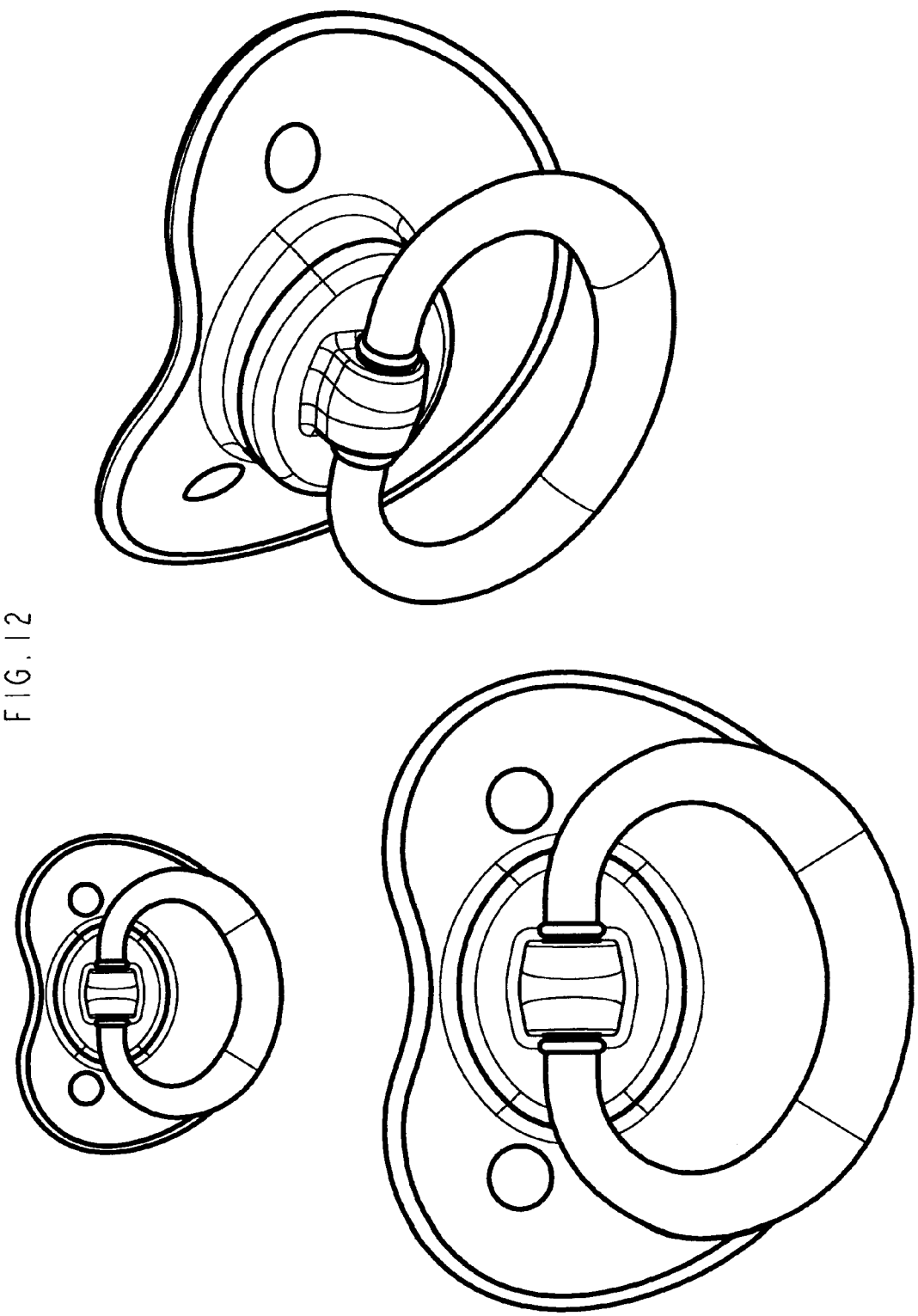
FIG. 12 includes views of an additional pacifier, in accordance with the invention, in which the pacifier is provided with a handle that pivots.
Figure 13:
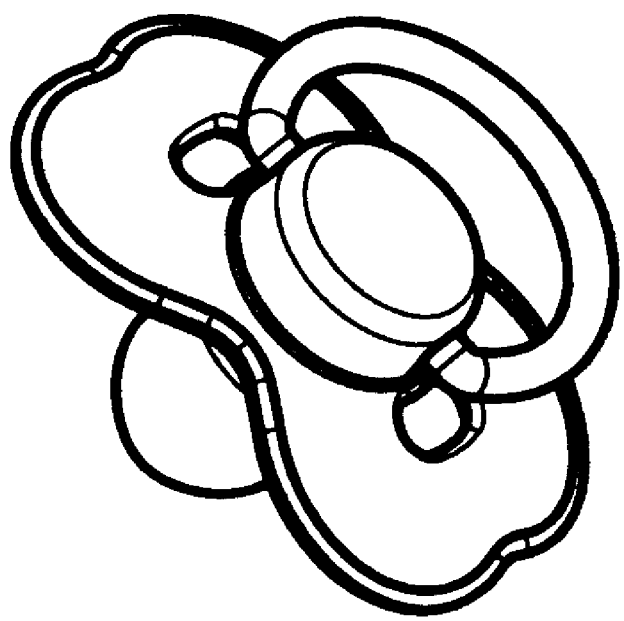
FIG. 13 is a perspective view of a further embodiment of the pacifier of FIG. 12, in which the pacifier is provided with a pivoting handle.

In the preferred embodiment, pacifier 18 or 22 is further provided with a polycarbonate insert post 72 or 76 and a domed cap 64 or 68. Insert post 72 or 76 is placed on one side of a first shield 30 or 34 (e.g. of Kraton) and a second shield 42 or 46 (e.g. of polypropylene), while domed cap 64 or 68 is placed on the opposing side. Specifically, the insert post 72 is snapped onto the shield on one side through the common hole 50 in the shields as shown in FIG. 1 (or through common hole 54, as shown in FIG. 2) and the domed cap 64 or 68 is welded onto the insert post to secure the Kraton shield 30 or 34 to the polypropylene shield 42 or 46. The nipple or baglet of the pacifier (not shown in the figure) extends through the opening in the insert post, e.g. opening 70 in insert post 72. In alternative embodiments of the invention, the pacifier can be provided with a handle, such as a handle that pivots, as shown in FIGS. 12 and 13.

Although Kraton is shown in the figures, in an alternative embodiment, silicone can be substituted. Alternatively, if desired, another suitable soft, flexible material such as a desired thermoset plastic or thermoplastic elastomer could be utilized.

Likewise, other materials can be substituted for the polypropylene component. For example, in alternative embodiments, a polycarbonate shield can be overmolded with a thermoset plastic or a thermoplastic elastomer to provide an alternate multi-component shield having hard and soft shield components.

In a further embodiment, the polypropylene shield 42 can be printed, if desired. Likewise, either a butterfly style shield can be used, as shown in FIG. 1, or a "nuk" style shield, as shown in FIG. 2. Alternatively, any other shield shape or design, or any other decorative features can be utilized.

In the preferred embodiment, in accordance with the present invention, the polypropylene is sufficiently thin so that it is flexible. In the preferred embodiment, the polypropylene component of the shield is approximately 0.035 inches thick and the kraton component is also approximately 0.035 inches thick, for a total shield thickness of approximately 0.070 inches. In alternate embodiments, the polypropylene and kraton components each range from approximately 0.010–0.040 inches in thickness. Accordingly, in accordance with the invention, even if the child does fall with the pacifier in his or her mouth, besides the buffering provided by the Kraton shield, the flexibility of the polypropylene is such that the pacifier should not break the baby's teeth or provide a hard impact against the baby mouth.

In a further embodiment of the invention, a multi-hardness baglet or nipple is provided, as well. This multi-hardness baglet or nipple can be used, for example, for a pacifier or a baby bottle. Alternatively, this teething item could be used in another desired application. The multi-hardness baglet or nipple includes both softer portions or sections, which are preferably relatively smooth, and harder portions or sections, which are preferably bumps, and are further preferably raised. In accordance with the invention, the harder portions or sections of the baglet or nipple assist the baby in teething. In a further embodiment of the invention, these harder portions can be of a different color than the rest of the baglet or nipple. In yet a further embodiment, these harder portions can be colored, such that a variety of colors of harder bumps are provided, and/or bumps are provided which are different in color from the rest of, or the softer portion of, the baglet.

Any desired shaped baglet or nipple can be made consistent with the invention. Thus, for example, the baglet can be a round baglet, an oval baglet, an orthodontic baglet, a cherry or ball shaped baglet, or any other desired shape. Similarly, the nipple can be in the shape of a standard bottle nipple, an orthodontic nipple, a disposable bottle nipple, a wide neck bottle nipple (i.e. a European style shape, which is approximately 2" in diameter), or any other desired shape.

In accordance with one preferred method of the present invention, Liquid Injection Manufacturing Silicone (LIMS) is utilized to create the baglet or nipple. In this embodiment, an injection machine set up for LIMS is utilized, as is well known in the art. In a preferred embodiment, a standard LIMS machine with two injectors is utilized, one injector being used for the hard material, and one for the soft.

In accordance with this method, a core in the shape of the baglet or nipple is first constructed out of tool steel. This core is placed mechanically or by hand into a first mold cavity, the cavity and the core having been heated to an appropriate process temperature, as is known in the art. For example, for LIM silicone a temperature of approximately 200–400 degrees Celsius can be utilized, and for HCR, a temperature of approximately 100–400 degrees Celsius can be utilized. A standard LIMS mold cavity can be utilized, as is known in the art.

In a preferred embodiment, the standard LIMS machine is modified to assist with the automation of the process. Preferably, the cores are mounted to a bar, which is mounted to a rotating spindle. This spindle is used to places the cores in the mold cavity, and to rotate the cores from one mold cavity to another in an automated fashion. In one embodiment of the invention, the modified machine is a modified Engel, model number ES 330/330/300-20-LIM, injection molding machine. An illustration of this modified configuration of the machine is shown in FIG. 14.

Following placement into the first mold cavity, a first, harder durometer material is injected and molded onto the core. Preferably, this first material is silicone, including, for example, LIM silicone or Heat Cured Rubber (HCR).

Alternatively, Kraton, Latex, rubber, or any other suitable desired thermoset plastic or thermoplastic elastomer can be used. In the preferred embodiment, an approximately 40–80 durometer material is used for the first material of the baglet or pacifier. For example, in one embodiment, an approximately 50 durometer material can be utilized.

Figure 4:
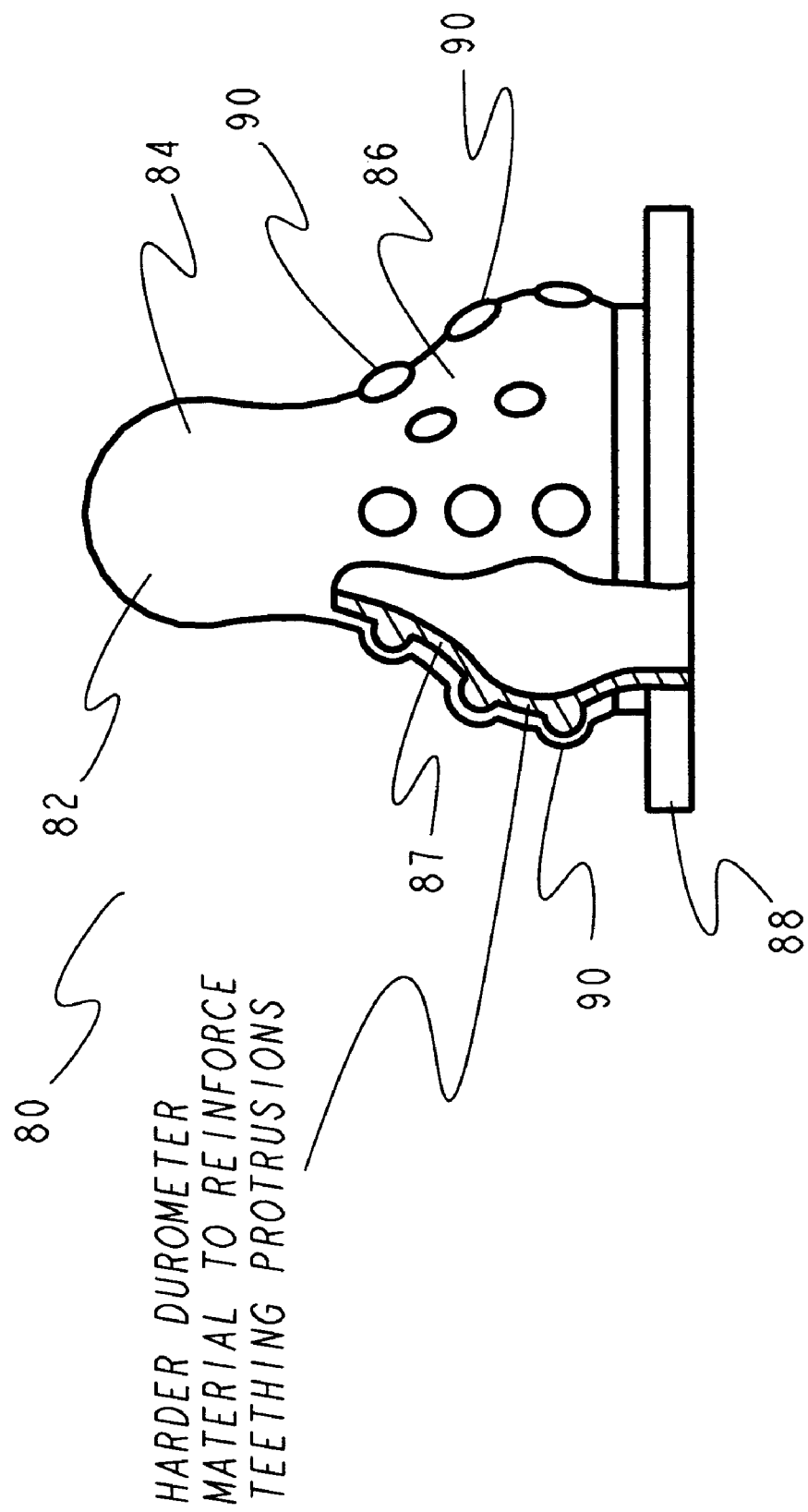
FIG. 4 is a partial cross sectional view of the bottle nipple of FIG. 3.

This first, harder, material is molded with bumps or protrusions, as shown in FIG. 4. These bumps, as disclosed herein, provide a teething surface for an infant to teethe on while using the pacifier.

After injection of the harder durometer material, the core, having the first material molded thereto, is removed by hand or mechanically from that mold and inserted into a second mold cavity. In a preferred embodiment, the spindle rotates and moves forward and backward from a moving platform. The core is then moved by the spindle. The spindle rotates the core approximately 180 degrees toward the second mold cavity, and then moves backward to insert the core into the second mold cavity itself. Preferably, air power and water are configured to run through the center of this spindle to avoid undue tangling or twisting when the spindle rotates and moves.

Once the core has been inserted into the second mold cavity, a second, softer material is then injected and molded onto the core and over the top of the first, harder, durometer material. This second, softer, material can likewise also be silicone, kraton, latex or any other suitable thermoset plastic or thermoplastic elastomer. This second material is softer in hardness than the material chosen for the first layer. For example, in contrast to the first material, the softer material is preferably a material chosen from those in the range of approximately 30–45 durometer materials. In one embodiment, for example, a 45 durometer material can be used.

The second material is injected and molded over the first layer before the first layer cools, to facilitate bonding between the two materials and layers. Accordingly, the first, harder, material is maintained in a heated state until the second material is overmolded to produce a secure bond between the two.

As is known in the art, the particulars of the process, can of course, be modified for the particular material utlized. Thus, while injection into a heated cavity is used for silicone as is known in the art and as described above, alternatively, a standard thermoplastic can be used which is injected into a cold cavity, as is also known in the art. Of course, even with a standard thermoplastic, however, the second material is injected and molded over the first material before the first unduly cools, to facilitate bonding between the two materials.

After injection of the second material onto the core, the mold cavity opens. Preferably the spindle or core remove the core from the mold cavity in an automated fashion. Once the core has been removed from the second mold cavity, the molded material can be removed from the core. On the core, two materials separate materials have bonded, forming a two layer shell which can be removed from the core to provide a baglet or nipple having components of two separate hardnesses which thereby assist a baby in teething.

In the preferred embodiment, the baglet or nipple mechanically ejected off of the core. In one preferred embodiment, the core is provided with a pin extending therethrough, e.g. through the core's center. Once the components have been molded onto the core, and the core has been removed from the second mold cavity, the pin is mechanically removed or retracted from the core (e.g. through the back of the core), opening the hole extending through the core. Air is then blown through that hole to eject the baglet or nipple off of the core. In one embodiment, a single pin is provided through the core. In an alternate embodiment, a plurality of pins is provided. A single pin can be used, for example, for oval baglets (e.g. wherein the pin is approximately 1/8th of an inch in diameter, although the pin diameter can vary, as desired). A double pin or multiple pins, can be used when it is desirable or necessary to disguide or hide the indentation or witness line from the air injection. For example, 1 mm–3/32 inch diameter pins can be used. A double or multiple pin configuration is useful, for example, for orthodontic baglets. In a further embodiment, however, instead of a retractable pin, an air pop it valve can, alternatively, be used to pop the baglet or nipple off of the core.

Following ejection of the baglet or nipple from the core, post curing can be done, if necessary, using a post curing process. Curing increases the strength of the material, and, more importantly, removes volatile materials to comport with the applicable regulations limiting these products to 0.05% maximum volatiles. A standard post curing protocol can be used in accordance with the normal post curing process for the particular material used in the baglet. For some materials, for example, the LIMS materials provided by General Electric Silicone (GE), no post curing is necessary. With the materials supplied by GE, volatiles are already below the required level, and curing is therefore not needed for removal of volatiles, nor is it needed for strength. Thus with GE LIMS materials, once the baglet or nipple has been ejected from the core it can be assembled into the pacifier or baby bottle. With other materials, however, e.g. the materials provided by Wacker Silicones Corporation of Adrien, Mich., or Bayer Corporation of Pittsburgh, Pa., post curing is necessary, and is conducted according to the standard properties of the particular materials used.

Although the term core is referred to herein in the singular, in all of the embodiments of the method of the present invention multiple cores can be moved simultaneously through the process of the present invention. For example, two or more cores can be simultaneously treated in a first mold cavity (or in a plurality of first mold cavities), and then moved to a second mold cavity or plurality thereof. In this manner, production of a large number of baglets or nipples can be effected at the same time during in each cycle of the process.

In a second embodiment of the method of the present invention, compression molding can be used to construct the present baglets and nipples. This molding can be effected using a thermoset or thermoplastic elastomer. As an example of a suitable thermoset elastomer, HCR can be used, or, as an example of a suitable thermoplastic, Kraton or polyurethane can be used, although the invention is not limited to these materials.

In accordance with this method, a core is first made for molding the elastomer materials and the core is heated as with LIMS. The first, harder, material is then placed into a compression mold, and the mold is closed to compress the material onto the core. As described above, this first material can be silicone, kraton, latex or any other suitable thermoset or thermoplastic elastomer, preferably a 40–80 durometer material.

After compression of the material onto the core, the core is then removed mechanically or by hand, and moved to a different mold. A second, soft material is placed into the mold and the core is forced into the mold, compressing the soft material into the core and over the harder material. As described above, this second material is silicone, kraton, latex or any other elastomer, preferably a 30–45 durometer material.

Once the second material has been molded onto and bonded to the first, the two layer shell, which forms the shape of a baglet or nipple, is removed from the core. After removal of this baglet or nipple, the finished product can be cured, if necessary. For example, HCR must be cured for clarity, strength, and to remove remaining volatile elements. Accordingly, this step is conducted, as necessary, depending on the materials utilized for the baglet or nipple. Thermoset materials, for example, need to be post cured, while post curing is not necessary for thermoplastics.

In the preferred embodiment of the invention, the thickness of the first, harder, material ranges from is approximately 0.01–0.07 inches from the bottom of this layer to the top of the bumps, i.e. this layer is approximately 0.01–0.07 inches at its thickest section. In one such embodiment, this layer is approximately 0.045 inches in thickness. The thickness of the intermediate areas in this first, harder, layer, i.e. the thickness in the areas between the bumps, is preferably approximately 0.005–0.060 inches in thickness.

With respect to the second, softer material layer, the thickness of this layer is approximately 0.01–0.06 inches in thickness in the thickest area of this soft layer where the bumps are located (also measured from the bottom of this layer to the top of the bumps). The thickness of this second, softer material layer, in the intermediate area where no bumps are located, is approximately 0.005–0.07 inches in thickness. In a preferred embodiment, the baglet or nipple has a uniform wall thickness, with the exception of where the bumps are located.

Figure 9:
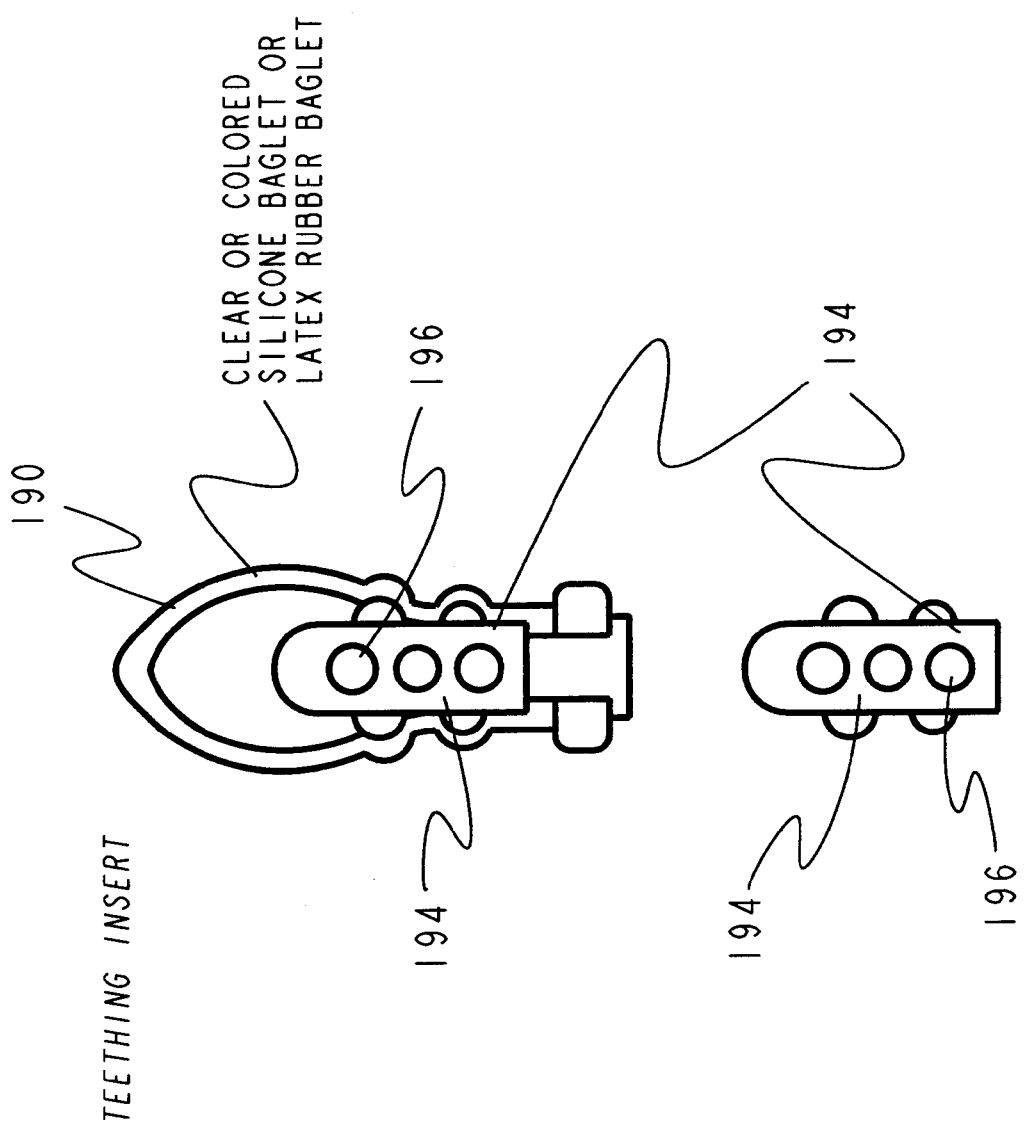
FIG. 9 is a cross sectional view of a further embodiment of a pacifier baglet in accordance with the invention.

In a third method method of constructing the baglet, a two layer baglet can be provided in which a normal baglet 190 has a tube, plug, or other device or layer 194 inserted therein, as shown in FIG. 9. The internal tube inserted into the nipple or baglet has harder bumps 196 located thereon. These bumps press press through the upper layer of the nipple or baglet to assist the baby in teething.

Figure 5:
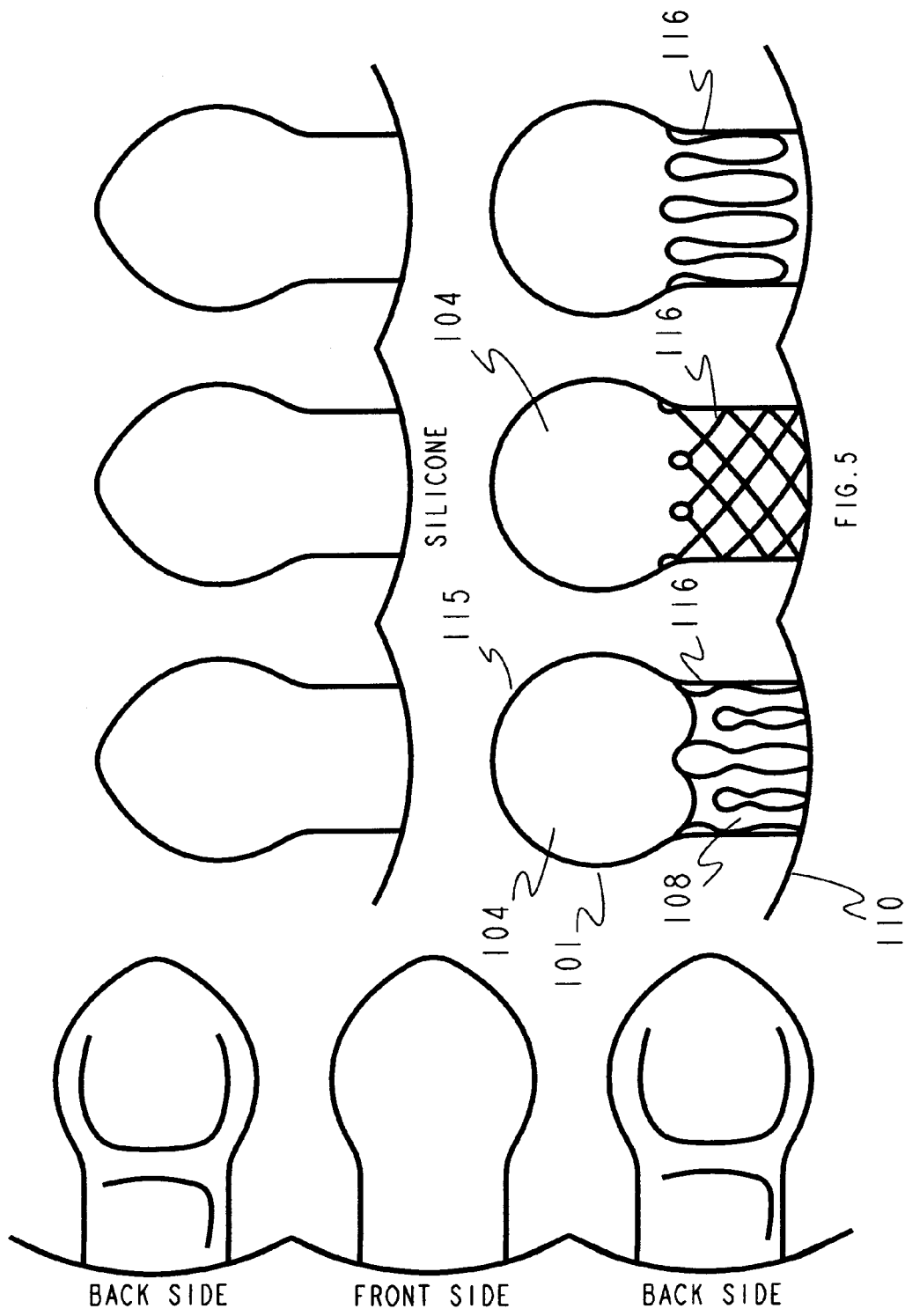
FIG. 5 is a series of views of a pacifier baglet, in accordance with the invention.

Thus, in accordance with the preferred embodiment of the invention, a dual hardness baglet or nipple is provided in which one portion of the baglet is softer and another portion is harder. The harder portion, preferably in the shape of bumps, will massage and rub the child or infant on his or her gums to allow the baby to teethe on the baglet, assisting the baby during the difficult period when his or her teeth are breaking through the gums. As shown in FIG. 5, in the preferred embodiment of the invention this harder portion is located on the lower section of the baglet or nipple, i.e. on the area which will rub up against and massage the baby's gums when the baglet or nipple is located in the baby's mouth. In a further embodiment of the invention, the harder portion is in the form of bumps, such as raised or depressed areas.

Although in the preferred embodiment of the invention, a dual hardness baglet or nipple is provided, i.e. a baglet or nipple of two hardnesses, any multiple number of hardnesses can be provided consistent with the invention herein. In further embodiments, a three-hardness baglet or nipple can be provided having components of three separate hardnesses, or a four-hardness baglet or nipple, or any higher multiple of hardnesses desired.

In an alternative embodiment of the invention, only one material is used for the baglet or nipple. In accordance with this embodiment, this single material is constructed or molded with bumps on it for the child to teethe on, the bumps being of the same hardness as the rest of the baglet or nipple. Thus, in this embodiment, a teething baglet or nipple is provided which is constructed using the known construction methods of the prior art. However, in contrast to the baglets and nipples of the prior art these baglets or nipples are shaped to have teething sections directly provided thereon.

Figure 3:
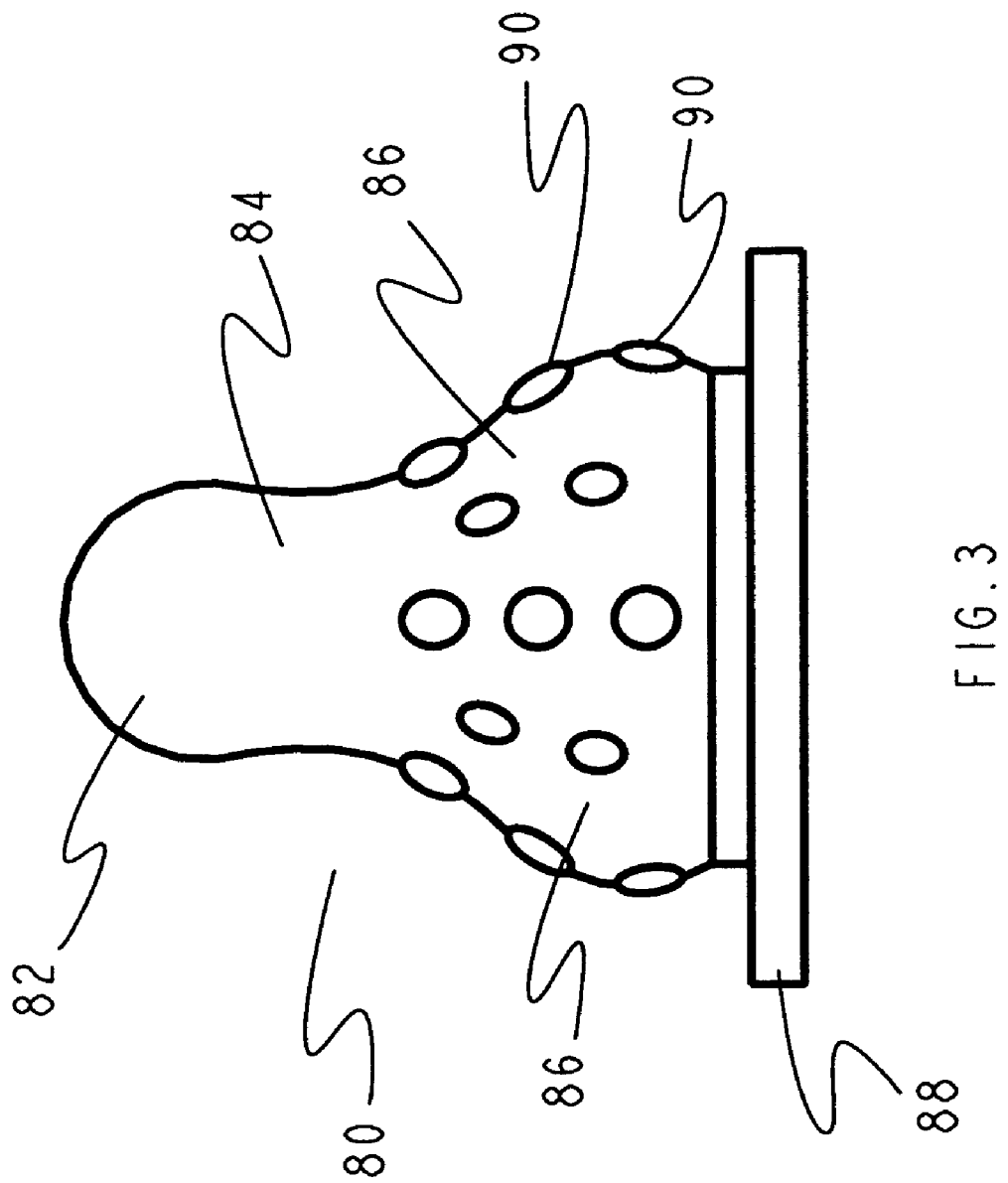
FIG. 3 is a side view of a bottle nipple in accordance with the present invention.
Figure 6:
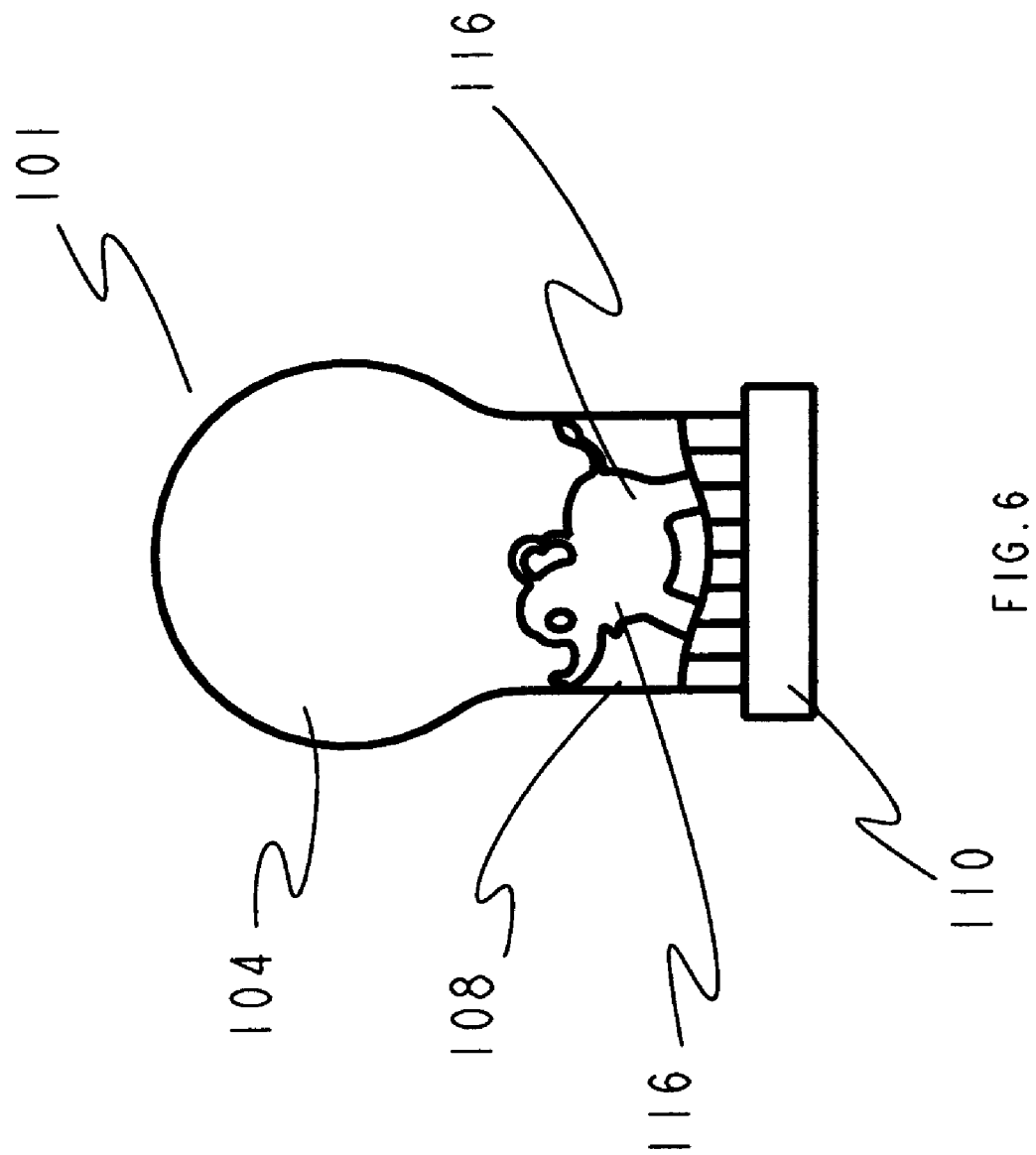
FIG. 6 is a side view of a further embodiment of a pacifier baglet in accordance with the invention.
Figure 7:
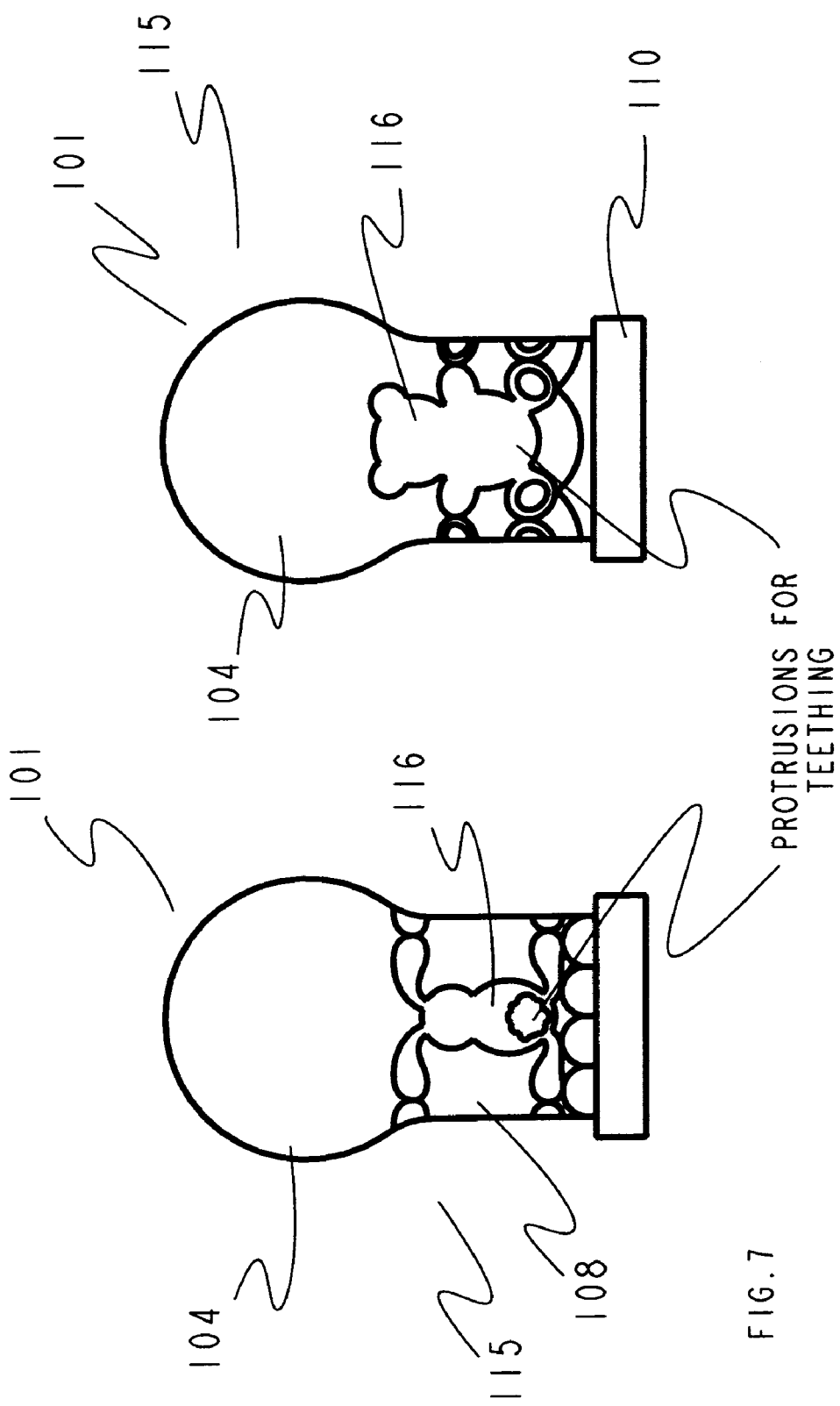
FIG. 7 is a side view of a further embodiment of a pacifier baglet in accordance with the invention.
Figure 8:
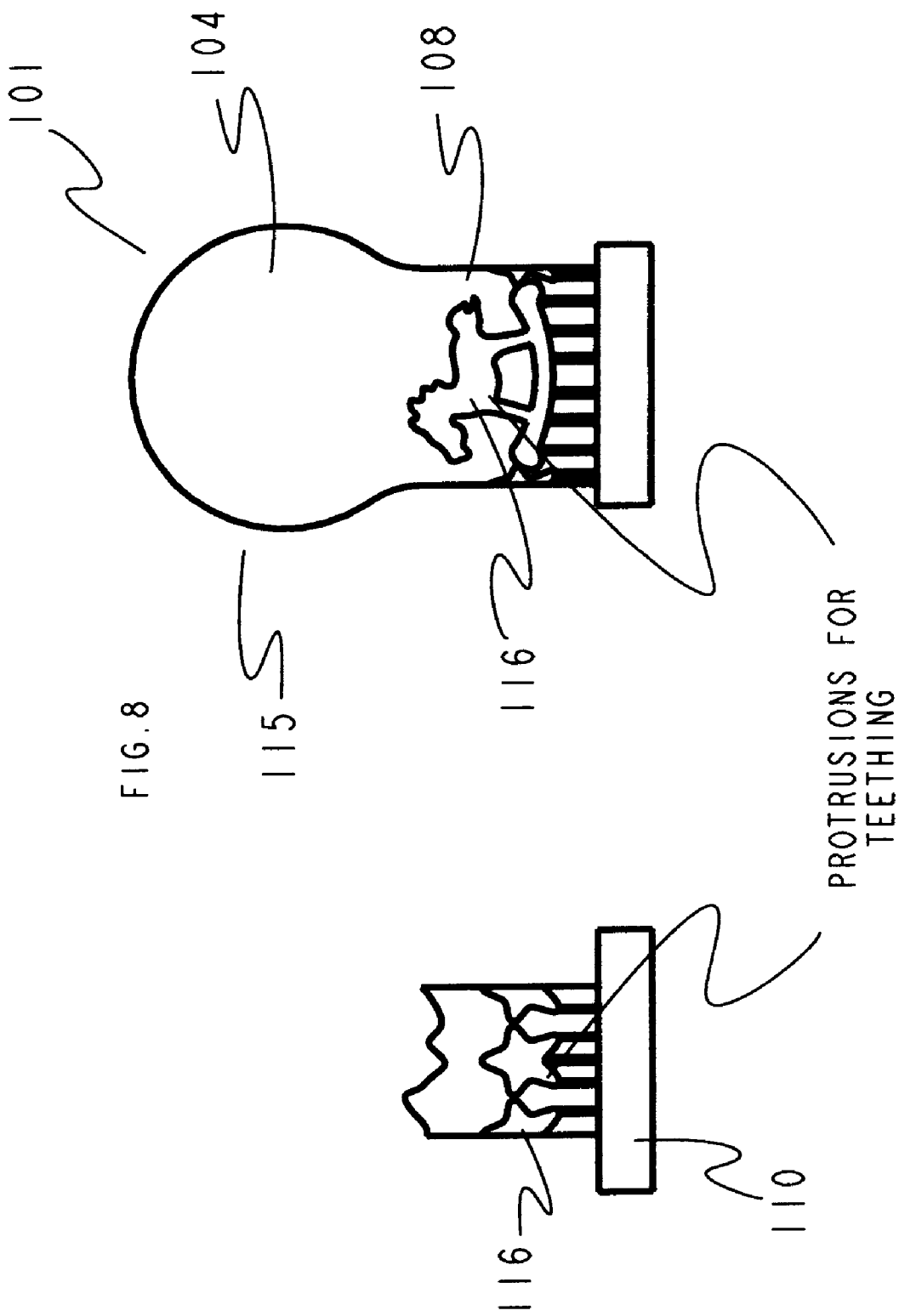
FIG. 8 is a side view of a further embodiment of a pacifier baglet in accordance with the invention.

As shown in FIGS. 3 and 4, bottle nipple 80 has a rim 88 which supports a lower section or body 86 in an upright position, with body 86 supporting a middle section or neck 84 which supports an upper section or tip 82, in a shape well known in the art. As shown in FIG. 6, pacifier baglet 101 has a rim 110 which supports a lower section or neck 108, with neck 108 supporting an upper section or bulb 104, in a shape also well known in the art. Bottle nipple can be made of any suitable material 83, such as silicone Kraton, latex, rubber or any other desired thermoset plastic or thermoplastic elastomer, and likewise for the material 115 of pacifier baglet 101, as previously discussed.

In accordance with the preferred embodiments of the inventions, lower section or body 86 of the nipple 80 and lower section or neck 108 of the pacifier are each provided with teething areas, as shown in the figures. Specifically, in the preferred embodiment of the baby bottle nipple 80, bumps, teething protrusions or areas for teething 90 are located on body 86 of nipple 80, as shown in FIGS. 3 and 4. A layer 87 of harder durometer material can be provided under the surface of the nipple 80 to reinforce the teething protrusions 90, as shown in FIG. 4. In the preferred embodiment of the pacifier baglet, bumps, teething protrusions or areas for teething 116 are located on neck 108 of the pacifier baglet, as shown, for example, in FIG. 6.

In one embodiment of the invention, whether in the multiple hardness teething baglets or nipples or with the single hardness teething baglet or nipple, the bumps are in the form of nubs or protuberances. In a further embodiment of the invention, the bumps of the nipple or baglet are in the form of other geometric shapes, including, for example, simple geometric designs such as ovals, or squares or triangles, or the shapes of images or characters, such as cartoon characters (e.g. Mickey Mouse®), or animal characters (e.g. small bears or ducks), or so forth, as shown in FIGS. 5–8. If desired, the bumps can be provided in a combination or assortment of such shapes on each baglet or nipple. Moreover, although, in the preferred embodiment, the bumps herein are raised and protrude above the surface of the baglet or nipple, in an alternate embodiment, the bumps discussed in the present application can be provided in the form of depressions or indentations. In this alternate embodiment, the intermediate region between the bumps are greater in height than the bumps themselves, which are depressed into the baglet or nipple surface. This alternate embodiment, in which the bumps are in the form of depressions, can also be used for effective teething purposes.

Figure 10:
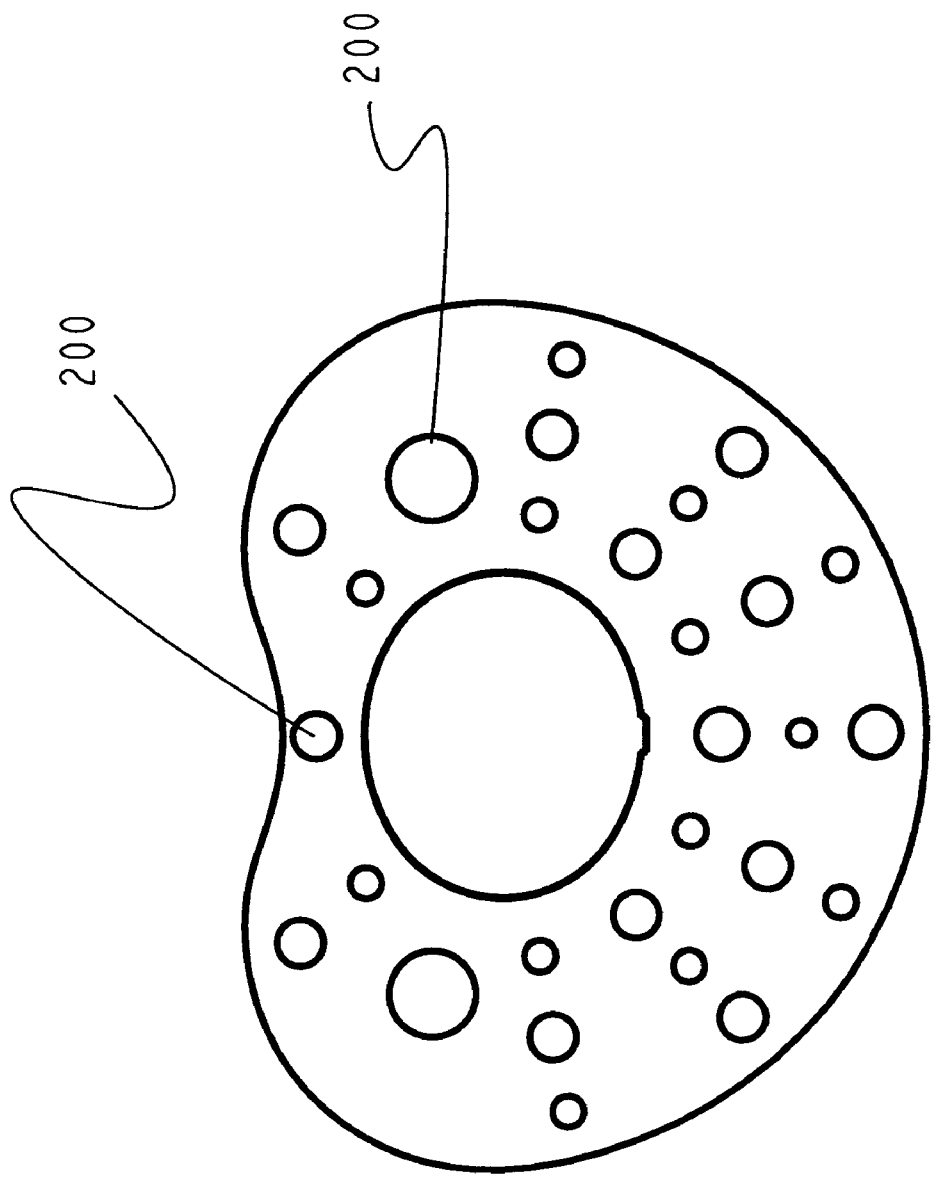
FIG. 10 is a top view of a pacifier shield, in accordance with a further embodiment of the present invention.
Figure 11:
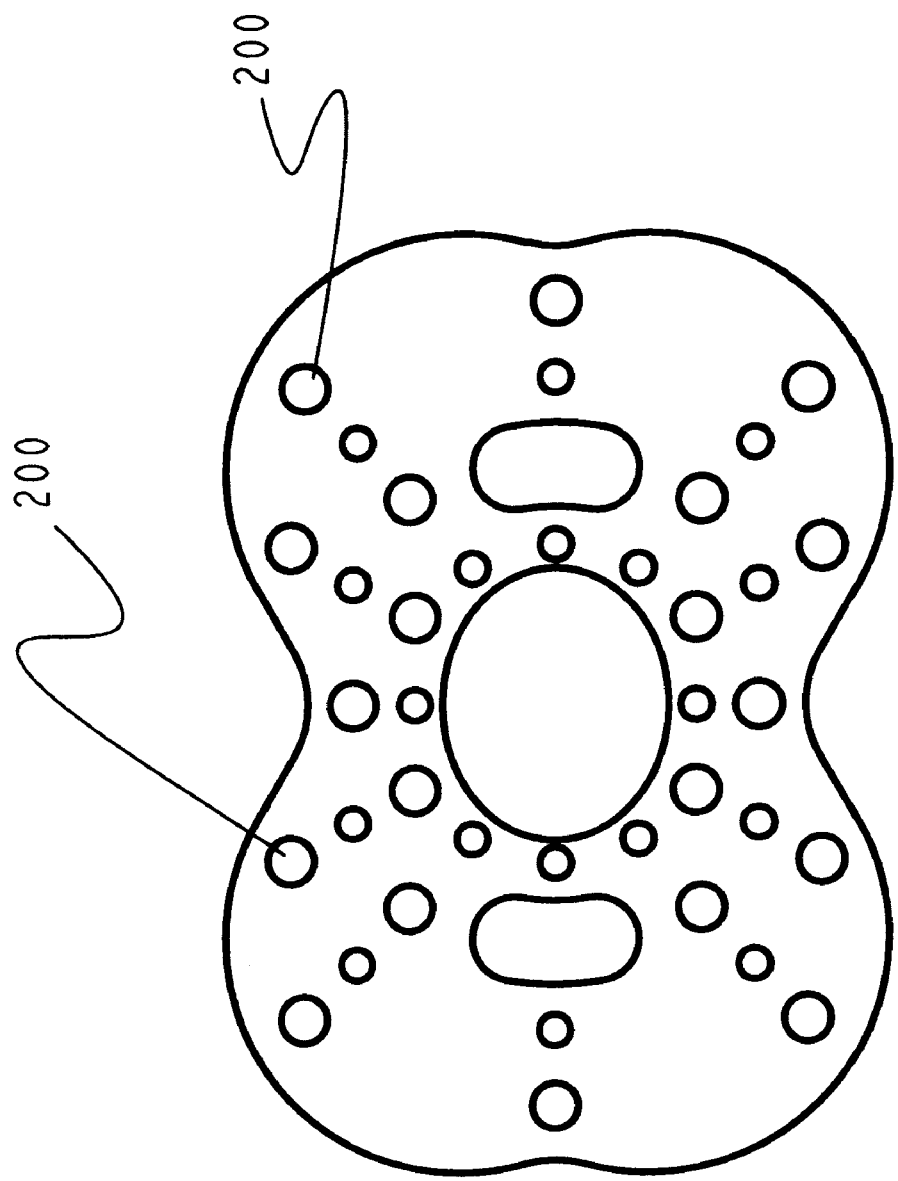
FIG. 11 is a top view of a further embodiment of a novel pacifier shield, in accordance with the invention.

In a further embodiment of the invention, pacifier shields are provided as shown in FIGS. 10–11. These shields are provided with small bumps 200 on the surface of the shield which rests against the baby's face. It is believed that these bumps or nubs may provide air gaps between the shield and the child's skin. Two separate embodiments of the design of these bumps or protuberances 200 and of the shapes of the shield are shown in FIGS. 10 and 11, although other embodiments of the design of these bumps can be used consistent with the invention.

Having described this invention with regard to specific embodiments, it is to be understood that the description is not meant as a limitation since further embodiments, modifications and variations may be apparent or may suggest themselves to those skilled in the art. It is intended that the present application cover all such embodiments, modifications and variations.

What is claimed is:

1. An apparatus, comprising:
a baby bottle nipple comprising a body, said nipple comprising bumps located on the exterior surface of said body, said bumps comprising both a first material and a second material, wherein said first material is harder than said second material.

2. An apparatus as claimed in claim 1, wherein said bumps comprise protrusions extending upward from said exterior surface.

3. An apparatus as claimed in claim 2, wherein said protrusions are provided for rubbing against a child's gums to assist with the child's teething.

4. An apparatus as claimed in claim 2, wherein said apparatus comprises a baby bottle.

5. An apparatus as claimed in claim 2, wherein said first material is an approximately 40–80 durometer material.

6. An apparatus as claimed in claim 2, wherein said second material is an approximately 30–45 durometer material.

7. An apparatus as claimed in claim 2, wherein said first material is an approximately 40–80 durometer material, and wherein said second material is a material in the range of approximately 30–45 durometer but of lesser durometer than said first material.

8. An apparatus as claimed in claim 2, wherein said first material is an approximately 50 durometer material.

9. An apparatus as claimed in claim 2, wherein said second material is an approximately 45 durometer material.

10. An apparatus as claimed in claim 2, wherein said first material is an approximately 50 durometer material and wherein said second material is an approximately 45 durometer material.

11. An apparatus as claimed in claim 2, wherein said nipple comprises a thermoset material.

12. An apparatus as claimed in claim 2, wherein said nipple comprises a thermoplastic material.

13. An apparatus as claimed in claim 2, wherein said nipple comprises a material selected from the group consisting of silicone and latex.

14. An apparatus as claimed in claim 2, wherein said nipple comprises a tip, said tip being free of said bumps.

15. An apparatus as claimed in claim 2, wherein said nipple comprises a neck, said neck being free of said bumps.

16. An apparatus as claimed in claim 2, wherein said bumps comprise geometric shapes.

17. An apparatus as claimed in claim 2, wherein said bumps comprise shapes of images.

18. An apparatus as claimed in claim 2, wherein said bumps comprise shapes of cartoon characters.

19. An apparatus as claimed in claim 2, wherein said bumps comprise shapes of animal characters.

20. An apparatus as claimed in claim 2, wherein said bumps are of multiple colors.

21. An apparatus as claimed in claim 1, wherein said bumps comprise depressions into said exterior surface.

22. An apparatus, comprising:
a baby bottle nipple comprising a body, said nipple comprising bumps located on the exterior surface of said body, said bumps comprising a layer of a first material and a layer of a second material, wherein said first material is harder than said second material.

23. An apparatus as claimed in claim 22, wherein said nipple further comprises a neck.

24. An apparatus as claimed in claim 22, wherein said nipple further comprises a rim.

25. An apparatus as claimed in claim 22, wherein said bumps comprise protrusions extending upward from said exterior surface.

26. An apparatus as claimed in claim 25, wherein said protrusions are provided for rubbing against a child's gums to assist with the child's teething.

27. An apparatus as claimed in claim 25, wherein said first material is an approximately 40–80 durometer material, and wherein said second material is a material of a hardness in the range of approximately 30–45 durometer but of lesser durometer than said first material.

28. An apparatus as claimed in claim 25, wherein said apparatus comprises a baby bottle.

29. An apparatus as claimed in claim 25, wherein said nipple comprises a thermoset material.

30. An apparatus as claimed in claim 25, wherein said nipple comprises a thermoplastic material.

31. An apparatus as claimed in claim 25, wherein said nipple comprises a material selected from the group consisting of silicone and latex.

32. An apparatus as claimed in claim 25, wherein said bumps comprise geometric shapes.

33. An apparatus as claimed in claim 25, wherein said bumps comprise shapes of images.

34. An apparatus as claimed in claim 25, wherein said bumps comprise shapes of cartoon characters.

35. An apparatus as claimed in claim 25, wherein said bumps comprise shapes of animal characters.

36. An apparatus as claimed in claim 25, wherein said bumps are of multiple colors.

37. An apparatus as claimed in claim 22, wherein said bumps comprise depressions into said exterior surface.

38. An apparatus, comprising:
a baby bottle nipple, said nipple comprising a body, said body being a portion of said nipple which is inserted into the baby's mouth and rests against the baby's gums during the baby's feeding, said nipple comprising bumps located on the exterior surface of said body, said bumps being provided for teething and not for the collapsing of said body to a desired degree, said bumps comprising both a material of a first hardness and a material of a second hardness.

39. An apparatus as claimed in claim 38, wherein said nipple further comprises a tip free of said bumps.

40. An apparatus as claimed in claim 38, wherein said nipple further comprises a rim.

41. An apparatus as claimed in claim 38, wherein said bumps comprise protrusions extending upward from said exterior surface.

42. An apparatus as claimed in claim 41, wherein said protrusions are provided for rubbing against a child's gums to assist with the child's teething.

43. An apparatus as claimed in claim 41, wherein said tip is free of said bumps such as are provided on said body.

44. An apparatus as claimed in claim 41, wherein said bumps comprise a layer of said material of a first hardness and a layer of said material of a second hardness.

45. An apparatus as claimed in claim 41, wherein said material of a first hardness is an approximately 40–80 durometer material, and wherein said material of a second hardness is a material of a hardness in the range of approximately 30–45 durometer but of lesser durometer than said material of a first hardness.

46. An apparatus as claimed in claim 41, wherein said apparatus comprises a baby bottle.

47. An apparatus as claimed in claim 41, wherein said nipple comprises a thermoset material.

48. An apparatus as claimed in claim 41, wherein said nipple comprises a thermoplastic material.

49. An apparatus as claimed in claim 41, wherein said nipple comprises a material selected from the group consisting of silicone and latex.

50. An apparatus as claimed in claim 41, wherein said bumps comprise geometric shapes.

51. An apparatus as claimed in claim 41, wherein said bumps comprise shapes of images.

52. An apparatus as claimed in claim 41, wherein said bumps comprise shapes of cartoon characters.

53. An apparatus as claimed in claim 41, wherein said bumps comprise shapes of animal characters.

54. An apparatus as claimed in claim 41, wherein said bumps are of multiple colors.

55. An apparatus as claimed in claim 38, wherein said bumps comprise depressions into said exterior surface.

56. An apparatus, comprising:
    a pacifier baglet comprising a neck, said baglet comprising bumps located on the exterior surface of said neck, said bumps comprising both a first material and a second material, wherein said first material is harder than said second material.

57. An apparatus as claimed in claim 56, wherein said bumps comprise protrusions extending upward from said exterior surface.

58. An apparatus as claimed in claim 57, wherein said protrusions are provided for rubbing against a child's gums to assist with the child's teething.

59. An apparatus as claimed in claim 57, wherein said apparatus comprises a pacifier.

60. An apparatus as claimed in claim 57, wherein said first material is an approximately 40–80 durometer material.

61. An apparatus as claimed in claim 57, wherein said second material is an approximately 30–45 durometer material.

62. An apparatus as claimed in claim 57, wherein said first material is an approximately 40–80 durometer material, and wherein said second material is a material in the range of approximately 30–45 durometer but of lesser durometer than said first material.

63. An apparatus as claimed in claim 57, wherein said first material is an approximately 50 durometer material.

64. An apparatus as claimed in claim 57, wherein said second material is an approximately 45 durometer material.

65. An apparatus as claimed in claim 57, wherein said first material is an approximately 50 durometer material, and wherein said second material is an approximately 45 durometer material.

66. An apparatus as claimed in claim 57, wherein said baglet comprises a thermoset material.

67. An apparatus as claimed in claim 57, wherein said baglet comprises a thermoplastic material.

68. An apparatus as claimed in claim 57, wherein said baglet comprises a material selected from the group consisting of silicone and latex.

69. An apparatus as claimed in claim 57, wherein said baglet comprises a tip, said tip being free of said bumps.

70. An apparatus as claimed in claim 57, wherein said bumps comprise geometric shapes.

71. An apparatus as claimed in claim 57, wherein said bumps comprise shapes of images.

72. An apparatus as claimed in claim 57, wherein said bumps comprise shapes of cartoon characters.

73. An apparatus as claimed in claim 57, wherein said bumps comprise shapes of animal characters.

74. An apparatus as claimed in claim 57, wherein said bumps are of multiple colors.

75. An apparatus as claimed in claim 56, wherein said bumps comprise depressions into said exterior surface.

76. An apparatus, comprising:
    a pacifier baglet, said baglet comprising a tip and a neck, said baglet comprising bumps located on the exterior surface of said neck, said bumps comprising a layer of a first material and a layer of a second material, wherein said first material is harder than said second material.

77. An apparatus as claimed in claim 76, wherein said bumps comprise protrusions extending upward from said exterior surface.

78. An apparatus as claimed in claim 77, wherein said bumps comprise depressions into said exterior surface.

79. An apparatus as claimed in claim 77, wherein said protrusions are provided for rubbing against a child's gums to assist with the child's teething.

80. An apparatus as claimed in claim 77, wherein said apparatus comprises a pacifier.

81. An apparatus as claimed in claim 77, wherein said first material is an approximately 40–80 durometer material.

82. An apparatus as claimed in claim 77, wherein said second material is an approximately 30–45 durometer material.

83. An apparatus as claimed in claim 77, wherein said first material is an approximately 40–80 durometer material, and wherein said second material is a material in the range of approximately 30–45 durometer but of lesser durometer than said first material.

84. An apparatus as claimed in claim 77, wherein said first material is an approximately 50 durometer material.

85. An apparatus as claimed in claim 77, wherein said second material is an approximately 45 durometer material.

86. An apparatus as claimed in claim 77, wherein said first material is an approximately 50 durometer material, and wherein said second material is an approximately 45 durometer material.

87. An apparatus as claimed in claim 77, wherein said baglet comprises a thermoset material.

88. An apparatus as claimed in claim 77, wherein said baglet comprises a thermoplastic material.

89. An apparatus as claimed in claim 77, wherein said baglet comprises a material selected from the group consisting of silicone and latex.

90. An apparatus as claimed in claim 77, wherein said baglet comprises a tip, said tip being free of said bumps.

91. An apparatus as claimed in claim 77, wherein said bumps comprise geometric shapes.

92. An apparatus as claimed in claim 77, wherein said bumps comprise shapes of images.

93. An apparatus as claimed in claim 77, wherein said bumps comprise shapes of cartoon characters.

94. An apparatus as claimed in claim 77, wherein said bumps comprise shapes of animal characters.

95. An apparatus as claimed in claim 77, wherein said bumps are of multiple colors.

* * * * *